Patented Jan. 8, 1952

2,581,507

UNITED STATES PATENT OFFICE 2,581,507

TREATMENT OF OXIDIZED HYDROCARBON MIXTURES AND PRODUCTS THEREOF

Carl N. Zellner, Providence, and Fred Lister, Elizabeth, N. J., assignors to Tide Water Associated Oil Company, Bayonne, N. J., a corporation of Delaware No Drawing. Application July 27, 1949, Serial No. 107,138

19 Claims. (Cl. 260—485)

The present invention relates to a method for treatment of certain oxidized hydrocarbon mixtures and products resulting from such treatment thereof.

In the oxidation of hydrocarbons by liquid phase oxidation with oxygen of a free oxygen-containing gas, complex oxidized hydrocarbon mixtures are obtained that comprise a wide variety of oxidized products, the exact nature of which appears to be primarily dependent upon the particular conditions employed for the oxidation. For example, by employing certain conditions in accordance with prior art disclosures for effecting the oxidation, oxidized hydrocarbon mixtures may be obtained that have relatively low saponification values, e. g., less than about 400 mgs. of KOH per gram and, hence, contain a substantial amount of monofunctional substances, e. g., monobasic acids, with a negligible amount, if any, of crystalline difunctional substances. On the other hand, and as is described more fully hereinafter, by varying the conditions under which the oxidation is effected oxidized hydrocarbon mixtures may be obtained that have relatively high saponification values, e. g., at least about 400 mgs. of KOH per gram and substantially higher, e. g., on the order of 500 to 625 or more. Such oxidized hydrocarbon mixtures contain, in addition to monofunctional substances, a substantial amount of crystalline difunctional substances, e. g., dibasic acids, and substances convertible thereto, the attainment of such relatively high saponification values being effective to convert a substantial amount of the hydrocarbons to polyfunctional in preference to monofunctional substances. Generally speaking, such oxidized hydrocarbon mixtures, prepared by liquid phase oxidation of hydrocarbons by reaction thereof with oxygen of a free-oxygen containing gas, and particularly when the oxidation is continued to relatively high saponification values, are characterized by having an acid value substantially lower than the saponification value and, in many instances, the acid to saponification differential often represents about 40% of the saponification value.

In copending application, Serial No. 625,961 (now U. S. Patent No. 2,486,454), filed October 31, 1945, of which one of us is the inventor, a method, and products resulting therefrom, has been described for treatment of hydrocarbons in liquid phase under controlled conditions by reaction of the hydrocarbons with oxygen of a free oxygen-containing gas. An important aspect of the invention disclosed therein is that, by use of the conditions disclosed, suppression of resinification is obtained both at the low as well as at the higher stages of oxidation. Suppression of resinification at the early stages of oxidation is important in that it not only enables preparation of crude oxidation mixtures with minimized formation of resinous materials at various stages of the oxidation but, of considerable importance, enables continuance of the oxidation to relatively high saponification values, e. g., over 400, whereby oxidized hydrocarbon mixtures may be prepared that contain a substantial amount of dibasic acids and polyfunctional substances convertible thereto. In one illustration, the process of the aforesaid copending application comprises contacting hydrocarbons in liquid phase with a gas containing free oxygen at an oxidizing temperature while controlling the rate of feed of the gas to the hydrocarbons and the gas distribution therein to maintain dispersed in the hydrocarbon an amount of gas sufficient to cause combination of oxygen at an average rate related to the oxidizing temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 160° C., and substantially above 135 liters of oxygen per hour per kilogram of hydrocarbons at an oxidizing temperature of 180° C.

Oxidized hydrocarbon mixtures prepared in the manner disclosed in the aforesaid copending application are characterized by having a substantial difference between the acid and the saponification value, the components accounting for the differential being largely composed of partially oxidized hydrocarbons of complex chemical structure. Such oxidized hydrocarbon mixtures are distinguishable over oxidized hydrocarbon mixtures known to the art and prepared by use of nitrogen compounds as oxidizing agents as, by use of such agents, more drastic oxidation occurs whereby intermediate oxidized compounds are either not formed to a substantial extent or, if formed, are substantially destroyed during the oxidation. Due to the presence of the stated partially oxidized substances of complex structure largely accounting for the difference between the acid and saponification values of oxidized hydrocarbon mixtures prepared in accordance with the aforesaid application, such oxidized hydrocarbon mixtures present problems that are not, as far as we are aware, encountered in oxidized hydrocarbon mixtures prepared by use of nitrogen compounds as oxidizing agents and particularly, by hydrocarbon mixtures oxidized with nitrogen compounds to the extent of preparing crude oxidized mixtures containing a substantial amount of dibasic and other polyfunctional acids. In illustration of certain problems encountered due to the presence of a substantial amount of intermediately oxidized components in oxidized mixtures prepared in accordance with the aforesaid copending application, reference is made to copending applications Serial No. 668,317 (now U. S. Patent No. 2,486,455), filed May 8, 1946, and 769,761 (now U. S. Patent No. 2,486,456), filed August 20, 1947, of which one of us is the inventor, disclosing thermal and catalytic treatments for crude oxidized hydrocarbons prepared in accordance with the method of copending application Serial No. 625,961 (now U. S. Patent No. 2,486,454) to effect improved recovery of crystalline dibasic acids by suppressing the effect of the intermediate oxidized hydrocarbons to inhibit recovery of crystalline polyfunctional components from the crude oxidized mixture.

Oxidized hydrocarbon mixtures disclosed in and prepared by the method set forth in copending application Serial No. 625,961 (now U. S. Patent No. 2,486,454) represent the types of starting materials contemplated for use in the practice of this invention, as is described more fully hereinafter. Investigations directed to the use of such oxidized hydrocarbon mixtures for recovery of certain desirable constituents thereof has revealed that such oxidized hydrocarbon mixtures perform in an unexpected manner. Since such oxidized hydrocarbon mixtures contain a substantial concentration of saponifiable constituents, consisting of both the compounds that account for the acid value as well as compounds that account for the difference between the acid and saponification value, it is highly desirable to treat such oxidized hydrocarbons to recover saponifiable constituents therefrom in highly useful form and in a simple and economic manner. Resort has therefore been made to use of conventional distillation in an attempt to recover the saponifiable value of such oxidized hydrocarbon mixtures in distillate form but such attempts have revealed that, by subjecting the crude oxidized mixtures to conventional distilling operations, the amount of saponifiable constituents recoverable in the distillate or distillates obtainable therefrom totals substantially less than the saponifiable value of the crude oxidized mixture subjected to the distillation. In specific illustration thereof, an oxidized hydrocarbon mixture, prepared by oxidizing a scale wax (105 to 108° F. melting point) in the manner disclosed in copending application Serial No. 625,961 (now U. S. Patent No. 2,486,454), and having an acid value of 408.8 and a saponification value of 632.8, was distilled and the results obtained are set forth in Table I. In that table, the figures of 94.9% shown as the weight yield (based on the weight of the oxidized hydrocarbon charge) and the 68.5% shown as the weight of saponifiable constituents recovered in the distillate include 3.1% (by weight of charge) of an aqueous acidic solution recovered in a Dry Ice trap employed in carrying out the distillation, said acidic solution containing .3% of saponifiable equivalents based on the saponifiable equivalents in the charge.

Table I

| Run No. | Total yield | | Distillate yields | | | | | | Bottoms (by Weight based on Charge) |
|---|---|---|---|---|---|---|---|---|---|
| | | | Fraction up to 100° C. at 0.2 mm. pressure—Acid Value=333.7; Sap. Value=610.4 | | Fraction at 100–175° C. at 1.0 mm. pressure—Acid Value=632.8; Sap. Value=739.2 | | Fraction from 175–197° C. at 1 to 3.2 mm. pressure—Acid Value=459.2; Sap. Value=652.4 | | |
| | Per Cent by Weight of Charge Recovered as Distillates and Bottoms | Per Cent of Saponifiable Equivalents in Distillates based on Saponifiable Equivalents in Charge | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | |
| 1 | 94.9 | 68.5 | 14.6 | 10.5 | 23.6 | 27.6 | 26.7 | 27.4 | 26.9 Per Cent (hard, brittle mass at 280° C. and 3.2 mm. pressure) |

The data in the foregoing table clearly shows that by subjecting the crude oxidized hydrocarbon mixture to distillation, 94.9% of the charge (by weight) was recovered, the 94.9% recovery being the sum of the distillate obtained plus the bottoms product (26.8%) which was a hard, brittle mass. Such a substantial amount of bottoms product was formed even though the distillation, carried out to a bottoms temperature of 280° C. at 3.2 mm. pressure, was not sufficient to effect decomposition as, during the distillation, no evidence of substantial, if any, evolution of carbon dioxide was observed. However, and although the total products recovery amounted to 94.9% of the charge, the saponifiable constituents of the charge were recovered in desired distillate form in an amount of only 68.5% based on the saponifiable constituent content of the oxidized hydrocarbon charge subjected to the distillation. It is clear, therefore, as evidenced by the foregoing data, that oxidized hydrocarbon mixtures, as contemplated for use as starting materials for practicing this invention, present a problem for recovery therefrom, in desired high yields, of the desirable saponifiable constituents present in such mixtures.

The present invention is directed to a method for treatment of oxidized hydrocarbon mixtures such as those of the type disclosed and prepared in the manner set forth in copending application Serial No. 625,961 (now U. S. Patent No. 2,486,454) to provide compositions which, as far as we are aware, are novel and which are improved in susceptibility to treatment by distillation to produce improved yields, in desired distillate form, of saponifiable equivalents present in the oxidized hydrocarbon mixture. The improved results obtained by practice of this invention and which are more fully described hereinafter are particularly evidenced by the improved yields of recoverable saponifiable constituents obtained by practice of this invention as compared to the results obtained (e. g. Table I) by subjecting the crude oxidized hydrocarbon mixtures to distillation without use of the treatment embodied by the present invention.

In broad aspect, the method of the present invention comprises reacting the crude oxidized hydrocarbon mixtures, as aforedescribed, with a suitable organic compound containing a hydroxyl group possessing alcoholic characteristics to effect combination between saponifiable groups in the oxidized hydrocarbon mixture with an amount of said hydroxyl-bearing compound equivalent to at least a portion, based on the acid value, of the oxidized hydrocarbon mixture. Although the invention broadly contemplates use of hydroxyl-containing compounds as aforesaid, particularly suitable compounds are monohydroxyl-containing compounds, illustrations of which include alcohols and more particularly aliphatic alcohols such as ethanol, methanol, butanol, 2-ethylhexanol, octanol, and the like. Hence, in the description of the invention as more fully set forth hereinafter, such alcohols have been employed for illustrative, but not limitative, purposes. In its most simple aspect, the method of this invention comprises reacting the crude oxidized hydrocarbon in mixture with the hydroxyl-containing compound, the hydroxyl-bearing compound being employed in an amount at least equal to the theoretical equivalent based on the extent which it is desired to effect combination thereof with saponifiable groups of the oxidized hydrocarbon mixture. In preferred form, however, the invention embodies use for the reaction of an amount of the hydroxyl-bearing compound in excess of the theoretical equivalent based on the extent to which it is desired to effect combination with saponifiable groups of the oxidized hydrocarbon mixture, and, in still more preferred form, the amount of the hydroxyl-bearing compound employed is at least equivalent to the theoretical based on the acid value, and even in excess thereof, e. g., equivalent to or in excess of the saponifiable value of the oxidized hydrocarbon mixture. As is set forth more fully hereinafter, it has been found that by subjecting such oxidized hydrocarbon mixtures to treatment with a hydroxyl-bearing compound as aforedefined, the resulting products are susceptible to treatment by distillation to produce an improvement in recovery of saponifiable constituents in the oxidized hydrocarbon mixture, thereby representing a marked improvement in the utilization of such oxidized hydrocarbon mixtures for recovery, particularly in highly desired distillate form, of the saponifiable constituents thereof.

In order to more fully describe the invention, while at the same time evidencing the improved results obtainable by practice thereof, a specific illustration is set forth in the following Table II. In that table, run No. 1 is the same as employed in Table I and has been reproduced in Table II for purposes of comparison with run No. 2 which includes treatment of the oxidized hydrocarbon mixture as embodied herein. In preparing the charge for run No. 2, the same oxidized hydrocarbon mixture was used as in run No. 1, except that for run No. 2, the oxidized hydrocarbon mixture was mixed with 2-ethylhexanol in an amount substantially twice the theoretical equivalent based on the saponification value of the oxidized hydrocarbon mixture. The resulting mixture was heated at 130° to 160° C. for 10 hours with periodic withdrawal of water formed during the reaction. Analysis of the alcohol-treated product showed that combination of the alcohol with saponifiable groups of the oxidized hydrocarbon mixture had occurred to the extent of 90.1% based on the acid value of the crude oxidized hydrocarbon mixture. The alcohol-treated product was then subjected to distillation to produce the results set forth in Table II.

*Table II*

| Run No. | Total yield | | Distillate yields | | | | | | Per Cent Bottoms (by Weight Based on Charge) |
|---|---|---|---|---|---|---|---|---|---|
| | | | Fraction up to 100° C. at 0.2 mm. pressure—Acid Value=333.7; Sap. Value=610.4 | | Fraction at 100-175° C. at 1.0 mm. pressure—Acid Value=632.8; Sap. Value=739.2 | | Fractions at 175-197° C. at 1-3.2 mm. pressure—Acid Value=459.2; Sap. Value=652.4 | | |
| | Per Cent by Weight of Charge Recovered as Distillates and Bottoms | Per Cent of Saponifiable Equivalents in Distillates (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | |
| 1 | 94.9 | 68.5 | 14.6 | 10.5 | 23.6 | 27.6 | 26.7 | 27.4 | 26.9% (hard, brittle, mass at 280° C. and 3.2 mm. pressure. |
| | | Per Cent of Saponifiable Equivalents in Distillates and Bottoms | Acid Value=10.64; Sap. Value=241.9 | | Acid Value=18.46; Sap. Value=319.2 | | Acid Value=64.4; Sap. Value=337.28; Fraction from 175° C. to 230° C. at 1-1.5 mm. pressure. | | |
| 2 | 96.9 | 91.9 | 5.2 | 3.1 | 36.9 | 35.0 | 45.5 | 45.5 | 9.3% (liquid at 330° C. and 1.5 mm. pressure and containing 8.3% of Saponifiable Equivalents based on Equivalents in Charge). |

By comparison of the results presented in Table II, it is evident that by practice of the present invention highly improved results are obtained particularly with respect to the recoverable amount, in suitable form as distillates, of the saponifiable equivalents in the oxidized hydrocarbon mixture. For example, whereas in run No. 1, 68.5% of the saponifiable equivalents were recovered in the distillate obtainable from the crude oxidized hydrocarbon mixture, the 91.9% recovery in run No. 2 represents a substantial and product, upon analysis, showed that combination of the alcohol with saponifiable groups of the oxidized hydrocarbon mixture had occurred to the extent of 93.2% based on the acid value of the oxidized mixture. The alcohol-treated mixture, upon being subjected to distillation, gave the results set forth in following Table III.

Table III

| Total Yield | | Distillate Yields | | | | | | |
|---|---|---|---|---|---|---|---|---|
| | | Fraction up to 100° C. at 0.2 mm. pressure—Acid Value=39.2; Sap. Value =375.2 | | Fraction from 100-175° C. at 0.2 mm. pressure— Acid Value=11.2; Sap. Value=285.6 | | Fraction from 175-235° C. at 0.6-1.3 mm. pressure—Acid Value= 39.2; Sap. Value=291.2 | | |
| Per Cent by Weight of Charge Recovered as Distillate plus Bottoms | Per Cent of Saponification Equivalents in Distillates plus Bottoms (based on Saponification Equivalents in Charge) | Per Cent by Weight of Charge | Per Cent of Saponification Equivalents (based on Saponification Equivalents in Charge) | Per Cent by Weight of Charge | Per Cent of Saponification Equivalents (based on Saponification Equivalents in Charge) | Per Cent by Weight of Charge | Per Cent of Saponification Equivalents (based on Saponification Equivalents in Charge) | Bottoms (by Weight based on Charge) |
| 92.3 | 100.3 | 11.0 | 12.8 | 45.5 | 44.0 | 24.2 | 27.9 | 11.6 (liquid at 325° C. at 1.3 mm. pressure and containing 15.6% of Saponification Equivalents based on Saponification Equivalents of Charge). | unexpected improvement in yield of saponifiable equivalents. Additionally, whereas in run No. 1, the product yield amounted to 94.9%, the corresponding yield in run No. 2 amounted to 96.9%. Still another advantage is evidenced by the small amount (9.3%) of bottoms product in run No. 2 as compared to run No. 1 (26.9%). Moreover, and even though run No. 2 was distilled to a higher bottoms temperature (330° C.) than run No. 1 (280° C.) the bottoms product of run No. 2 was not, as in run No. 1, a hard, brittle mass, but was in the form of a viscous liquid. As in run No. 1, no evidence of carbon dioxide formation was observed with run No. 2, thus illustrating that the highly improved results of run No. 2 were not obtained at the expense of carrying out the distillation to the extent of effecting product decomposition as would be evidenced by evolution of carbon dioxide.

Although the foregoing data illustrates the unexpected improvement in recovery of desirable constituents of the crude oxidized hydrocarbon mixtures, such improvements having resulted by practice of this invention, several other examples are set forth hereinafter showing the flexibility of the present invention when practised with use of hydroxyl-bearing organic compounds and/or reaction conditions other than those employed in the treatment described for preparation of the charge for run No. 2 (Table II).

A crude oxidized hydrocarbon mixture, prepared by oxidizing a scale wax (105 to 108° F. melting point) in the manner disclosed in copending application Serial No. 625,961 (now U. S. Patent No. 2,486,454) and having an acid value of 341.6 and a saponification value of 548.8 was mixed with an amount of 2-ethylhexanol double the theoretical equivalent based on the saponification value of the oxidized hydrocarbon mixture. The alcohol-containing mixture was refluxed for 5 hours at the boiling temperature of 2-ethylhexanol with periodic withdrawal of water formed during the reaction. The alcohol-treated A crude oxidized hydrocarbon mixture, as used in run No. 1 (Table I), was mixed with butanol in an amount substantially double the theoretical equivalent based on the saponification value of the oxidized hydrocarbon mixture. The alcohol-containing mixture was heated at 106-115° C. for two hours while periodically withdrawing water formed during the reaction. Upon analysis, the reaction product showed that combination of the alcohol with saponifiable groups of the oxidized hydrocarbon mixture had occurred to the extent of 39% based on the acid value of the oxidized mixture. The reaction product, upon being subjected to distillation, gave the results set forth in following Table IV. Comparison of the data in Table IV with that of Table I clearly evidences that the butanol reacted product, in which butanol combination was effected to the extent of 39% based on the acid value of the oxidized hydrocarbon mixture, provided a highly improved yield of saponifiable equivalents in the distillates recoverable therefrom.

A crude oxidized hydrocarbon mixture, as used in run No. 1 (Table I), was mixed with an amount of methanol double the theoretical equivalent based on the saponification value of the oxidized hydrocarbon mixture. The alcohol-containing mixture was heated at 70 to 78° C. for 16 hours with periodic withdrawal of water formed during the reaction. Analysis of the reaction mixture showed that combination of alcohol had occurred with saponifiable groups of the oxidized hydrocarbon mixture equal to 55.9% based on the acid value of the oxidized hydrocarbon mixture. The reaction product, upon distillation, produced the results set forth in Table V. In Table V, the 93.2% yield by weight of charge and the 85.0% yield of saponifiable equivalents include 4% (by weight of charge) of an acidic aqueous solution recovered in a dry ice trap employed in carrying out the distillation, said acidic solution containing 3.4% of the saponifiable equivalents of the charge. Here again, upon comparison of the data

Table IV

| Total Yield | | Distillate Yields | | | | | | Percent Bottoms (by Weight based on Charge) |
|---|---|---|---|---|---|---|---|---|
| | | Fraction up to 100° C. at 1 mm. pressure—Acid Value=90.1; Sap. Value=448.0 | | Fraction at 100-175° C. at 1 mm. pressure—Acid Value=224; Sap. Value=532 | | Fraction at 175-225° C. at 1-5 mm. pressure—Acid Value=235.2; Sap. Value=534.8 | | |
| Per Cent by Weight of Charge Recovered as Distillate and Bottoms | Per Cent of Saponifiable Equivalents in Distillates plus Bottoms (based on Saponifiable Equivalents in Charge) | Per Cent by Weight of Charge | Per Cent of Saponifiable Equivalents (Based on Saponifiable Equivalents in Charge) | Per Cent by Weight of Charge | Per Cent of Saponifiable Equivalents (Based on Saponifiable Equivalents in Charge) | Per Cent by Weight of Charge | Per Cent of Saponifiable Equivalents (Based on Saponifiable Equivalents in Charge) | |
| 97.0 | 87.1 | 16.1 | 12.6 | 41.4 | 40.4 | 21.4 | 20.0 | 18.1 (viscous mass containing 14.1% of saponifiable equivalents based on saponifiable equivalents in charge). | in Table V with Table I, the alcohol-treated mixture provided a highly improved yield of saponifiable equivalents in distillate form.

equivalent to all or substantially all of the acid value of the oxidized hydrocarbon mixture.

The distillates obtained by distillation of the

Table V

| Total yield | | Distillate yields | | | | | | Per Cent Bottoms (by Weight based on Charge |
|---|---|---|---|---|---|---|---|---|
| | | Fraction up to 100° C. at 0.1 mm. pressure—Acid Value=44.6; Sap. Value=628 | | Fraction from 100 to 170° C. at 0.1 mm. pressure—Acid Value=146; Sap. Value=590 | | Fraction from 170 to 240° C. at 0.1-5.5 mm. pressure—Acid Value=196; Sap. Value=575 | | |
| Per Cent by Weight of Charge Recovered as Distillate and Bottoms | Per Cent by Weight of Saponifiable Equivalents in Distillates plus Bottoms (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | |
| 93.2 | 85.0 | 24.8 | 26.5 | 22.9 | 23.4 | 28.9 | 28.5 | 12.6 (semi-liquid at 350° C. at 5.5 mm. pressure and containing 3.4 Per Cent of saponifiable equivalents of charge). |

As is apparent from the foregoing, the highly improved results embodied herein are obtainable by effecting combination of at least a portion, as calculated on the said value, of the saponifiable groups in the oxidized hydrocarbon mixture with the hydroxyl-bearing compound. As is further apparent from the foregoing, the amount of saponifiable groups combined may be varied over rather wide limits and yet improve the susceptibility of the oxidized hydrocarbon mixture to distillation with improved recovery of saponifiable equivalents thereof in desirable distillate form. As shown by the foregoing data, illustrating specific embodiments of the invention, a marked improvement was provided by effecting alcohol combination with saponifiable groups varying from 39 to 93.2% based on the acid value of the oxidized hydrocarbon mixture. Although effecting combinations between the saponifiable groups and the hydroxyl-bearing compound to such extents illustrate suitable aspects of the invention, the invention is not limited thereto as improved results with respect to recoverability of saponifiable equivalents may be obtained by effecting such combination to lower values, e. g., to the extent of about 20% based on the acid value of the oxidized hydrocarbon mixture, and to higher values than set forth in the foregoing examples, e. g., combining saponifiable groups to an extent crude oxidized hydrocarbon mixtures treated in accordance with this invention are highly desirable products that are suitable for many and various purposes. In particular, distillates thus obtained, and as illustrated by the distillate fractions set forth in the foregoing tables, are highly useful as organic solvents, as intermediates for preparation of chemical derivatives of the constituents of the distillates, and are adaptable for treatment for recovery from such distillates of chemical compounds such as useful acids, including polyfunctional acids and such acids in combination with an alcohol or other hydroxyl-bearing compounds as embodied for use herein, and the like.

Although the exact reasons underlying the improved results obtained by practicing this invention are not known, due to the chemical complexity of compounds present in the oxidized hydrocarbon mixtures, and particularly the compounds accounting for the difference between the acid and saponification value thereof, it is apparent from the data presented herein that improvements in the yield of saponifiable equivalents may be obtained by subjecting crude oxidized hydrocarbon mixtures, as embodied herein, to treatment as aforedescribed. Although it is not intended that the present invention be bound by any theories as to the reasons for obtainment of such improved results, it is possible that by such treatment of the crude oxidized mixtures, and particularly upon such treatment thereof whereby the hydroxyl-bearing compound reacts with saponifiable groups in the oxidized hydrocarbon mixture in an amount equivalent to all or a substantial portion of the acid value, certain components in the oxidized hydrocarbon mixtures are suppressed as to their inhibiting effect on the recovery of saponifiable equivalents in the form of distillates. That a treatment as embodied herein provides such improved results is clearly unexpected. For instance, the crude oxidized hydrocarbon mixtures embodied for use as starting materials comprise a substantial amount of acids and, generally speaking, it is known to those skilled in the art that acids are relatively heat stable substances. In view of such knowledge, and the data presented in Table I, it would appear that the difficulty encountered in endeavors to obtain high yields of recoverable saponificaton constituents in the form of distillates from the crude oxidized hydrocarbon mixture per se may be attributed to the presence in the oxidized hydrocarbon mixtures of the complex partially oxidized intermediates accounting for the difference between the acid and saponification value of the oxidized mixture. Hence, by practicing the present invention, whereby the oxidized hydrocarbon mixture is treated with a hydroxyl-bearing compound as aforedefined to effect combination in an amount equivalent to all or a substantial portion of the acid value, thereby providing compositions which apparently still contain a substantial amount, or all, of the portion accounting for the difference between the acid and saponification value in uncombined form, it is clearly unexpected that the treated mixtures, which still contain the components that are believed to inhibit recovery of saponifiable constituents, would be susceptible to treatment by distillation with improved recoveries as aforedescribed. Although, in treating crude oxidized hydrocarbons as aforedescribed, a reaction occurs whereby combination of the hydroxyl-bearing compound is effected with a certain amount of the saponifiable groups in the crude oxidized mixture, it appears that, in addition thereto, such a treatment in some manner alters the molecular structure of certain components present in the portion accounting for the difference between the acid and saponification value of the oxidized hydrocarbon mixture. It is believed that by use of such a treatment, certain normally non-distillable components of the oxidized hydrocarbon mixture are altered in molecular structure, possibly by depolymerization, or are inhibited against polymerization, whereupon such normally non-distillable compounds are recoverable by distillation to provide substantially increased recoveries of saponifiable equivalents from the oxidized hydrocarbon mixtures.

Although the present invention has been described in conjunction with certain preferred embodiments thereof, those skilled in the art will readily recognize that variations and modifications can be made. Such modifications and variations are to be considered to be within the purview of the specification and scope of the appended claims.

We claim:

1. A method for treating an oxidized hydrocarbon mixture, as defined hereinafter, to increase the recoverability of saponifiable constituents thereof in distillate form, said oxidized hydrocarbon mixture being characterized by having a substantial difference between the acid and saponification values and having been prepared by contacting hydrocarbons in liquid phase at an oxidizing temperature with a gas containing free oxygen to combine oxygen with the hydrocarbons at an average rate related to the oxidizing temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 160° C., and substantially above 135 liters of oxygen per hour per kilogram of hydrocarbons at an oxidizing temperature of 180° C., which comprises reacting said oxidized hydrocarbon mixture with an organic compound containing a hydroxyl group possessing alcoholic characteristics to combine saponifiable groups of said oxidized hydrocarbon mixture with said hydroxyl-bearing compound and recover from said reaction mixture an amount of alcohol reacted products not in excess of the amount of alcohol reactables in said oxidized mixture as calculated on its acid value.

2. As a new composition, a reaction product prepared by the method of claim 1.

3. As a new composition, a distillate fraction obtained by distillation of the reaction product defined in claim 2.

4. A method, as defined in claim 1, wherein the hydroxyl-bearing compound is an aliphatic alcohol.

5. As a new composition, the alcohol reaction product prepared by the method of claim 4.

6. A method, as defined in claim 1, wherein the oxidized hydrocarbon mixture has a saponification value of at least 400 mgs. of KOH per gram.

7. As a new composition, the reaction product prepared by the method of claim 6.

8. A method, as defined in claim 1, wherein the reaction product is subjected to distillation for recovery of said alcohol reacted products.

9. A method, as defined in claim 1, wherein the oxidized hydrocarbon mixture is combined with said hydroxyl-bearing compound in an amount equivalent to at least 20% as calculated on the acid value of said oxidized hydrocarbon mixture.

10. As a new composition, the reaction product prepared by the method of claim 9.

11. A method, as defined in claim 1, wherein the oxidized hydrocarbon mixture has a saponification value of at least 400 and has been prepared by oxidation of a predominantly paraffinic hydrocarbon mixture, and the hydroxyl-bearing compound is a monohydric alcohol.

12. A method for treating an oxidized hydrocarbon mixture as defined hereinafter to increase the recoverability of saponifiable constituents thereof in distillate form, said oxidized hydrocarbon mixture being characterized by having a substantial difference between acid and saponification value and having been prepared by liquid phase rapid oxidation of hydrocarbons with a gas containing free oxygen, which comprises reacting said oxidized hydrocarbon mixture with an organic compound containing a hydroxyl group possessing alcoholic characteristics to combine saponifiable groups of said oxidied hydrocarbon mixture with said hydroxyl-bearing compound and recover from said reaction mixture an amount of alcohol reacted products not in excess of the amount of alcohol reactables in said oxidized mixture as calculated on its acid value.

13. A method, as defined in claim 12, wherein the oxidized hydrocarbon mixture has a saponification value of at least 400 and has been prepared by oxidation of a predominantly paraffinic hydrocarbon mixture.

14. A method, as defined in claim 13, wherein the hydroxyl-bearing compound is a monohydric alcohol.

15. A method, as defined in claim 1, wherein the oxidized hydrocarbon mixture has a saponification value of at least 400 and has been prepared by oxidation of a predominantly paraffinic hydrocarbon mixture, the hydroxyl-containing compound is a mono-hydric aliphatic alcohol and the oxidized hydrocarbon mixture is reacted with the alcohol at an elevated temperature but below the decomposition temperature of said oxidized mixture with withdrawal of water formed during said reaction.

16. A method, as defined in claim 12, wherein the oxidized hydrocarbon mixture has a saponification value of at least 400 and has been prepared by oxidation of a predominantly paraffinic hydrocarbon mixture, the hydroxyl-containing compound is a mono-hydric aliphatic alcohol, and the oxidized hydrocarbon is reacted with the alcohol at an elevated temperature but below the decomposition temperature of said oxidized mixture.

17. A method for treating an oxidized hydrocarbon mixture, as defined hereinafter, to increase the recoverability of saponifiable constituents thereof in distillate form, said oxidized hydrocarbon mixture being characterized by having a substantial difference between acid and saponification value and having been prepared by liquid phase rapid oxidation of hydrocarbons with a gas containing free oxygen, which comprises reacting said oxidized hydrocarbon mixture with an organic compound containing a hydroxyl group possessing alcoholic characteristics to combine a substantial portion of the saponifiable groups in said mixture with said alcoholic compound, the amount of saponifiable groups thus combined being not in excess of that equivalent to saponifiable groups in said oxidized mixture as calculated on its acid value, and produce a reaction mixture distillable to yield in distillate form an amount of saponifiable constituents in excess of those as calculated on the acid value of said oxidized mixture and substantially in excess of the amount of saponifiable constituents recoverable in distillate form by distillation of said oxidized mixture in the absence of the aforesaid reaction with an alcoholic compound.

18. A method, as defined in claim 17, wherein the oxidized hydrocarbon mixture has been prepared by combining oxygen with a predominantly aliphatic hydrocarbon mixture at an average rate related to the oxidation temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 160° C., and substantially above 135 liters of oxygen per hour per kilogram of hydrocarbons at an oxidizing temperature of 180° C.

19. A method, as defined in claim 17, wherein the oxidized hydrocarbon has a saponification value of at least 400 and has been prepared by oxidation of a predominantly aliphatic hydrocarbon mixture, and the alcoholic compound is a monohydric aliphatic alcohol.

CARL N. ZELLNER.
FRED LISTER.

REFERENCES CITED

The following references are of record in the file of this patent:

UNITED STATES PATENTS

| Number | Name | Date |
|---|---|---|
| 1,848,724 | Jaeger | Mar. 8, 1932 |
| 2,054,979 | Jahrstorfer et al. | Sept. 22, 1936 |